United States Patent [19]

McCall, Jr. et al.

[11] Patent Number: 5,023,673

[45] Date of Patent: Jun. 11, 1991

[54] SEMICONDUCTOR MESA STRUCTURED OPTICAL PROCESSING DEVICES, WITH ADDED SIDE-SURFACE RECOMBINATION CENTERS TO IMPROVE THE SPEED OF OPERATION

[75] Inventors: Samuel L. McCall, Jr., Chatham; Kuochou Tai, North Plainfield, both of N.J.

[73] Assignee: AT&T Bell Laboratories, Murray Hill, N.J.

[21] Appl. No.: 384,341

[22] Filed: Jul. 21, 1989

[51] Int. Cl.[5] .................. H01L 29/161; H01L 29/205; H01L 29/225; H01L 29/34
[52] U.S. Cl. ........................................ 357/16; 357/17; 357/52; 357/64; 250/211 R; 250/211 J; 250/493.1; 350/96.12; 350/600
[58] Field of Search ........................ 357/64, 52, 16, 17; 250/211 R, 211 J, 493.1; 350/96.12, 600

[56] References Cited

U.S. PATENT DOCUMENTS

| | | | |
|---|---|---|---|
| 4,696,828 | 9/1987 | Schachzer et al. | 427/38 |
| 4,804,639 | 2/1989 | Yablonovitch | 437/129 |
| 4,843,037 | 6/1989 | Yablonovitch et al. | 437/235 |
| 4,861,976 | 8/1989 | Jewell et al. | 250/211 J |

OTHER PUBLICATIONS

*Appl. Phys. Lett.* 53 (4), Jul. 25, 1988, "Optical Measurement of Surface Recombination in InGaAs Quantum Well Mesa Structures", by K. Tai et al, pp. 302–303.

*Appl. Phys. Lett.* 50 (13), Mar. 30, 1987, "1.55 um Optical Logic Etalon with Picojoule Switching Energy Made of InGaAs/InP Multiple Quantum Wells", by K. Tai et al, pp. 795–797.

*Primary Examiner*—Rolf Hille
*Assistant Examiner*—David Ostrowski
*Attorney, Agent, or Firm*—D. I. Caplan

[57] ABSTRACT

A semiconductor multiple quantum well mesa structure, for use as the optically active element in an optical logic or an optically controlled optical switching device, has its side surfaces implanted with surface recombination centers, whereby the optical switching speed is increased.

1 Claim, 1 Drawing Sheet

SEMICONDUCTOR MESA STRUCTURED OPTICAL PROCESSING DEVICES, WITH ADDED SIDE-SURFACE RECOMBINATION CENTERS TO IMPROVE THE SPEED OF OPERATION

TECHNICAL FIELD

This invention relates to optical processing devices, including optical logic devices and optically or electronically controlled optical switching devices, and more particularly to such optical devices which have a semiconductor mesa structure.

BACKGROUND OF THE INVENTION

Semiconductor optical logic devices (logic gates) and optically or electronically controlled optical switching devices (optical switches) are useful in a variety of contexts, such as telecommunications. These devices typically operate with inputs consisting of a (binary digitally) pulsed control signal (A) and a controlled optical beam (B) which may or may not be pulsed depending upon whether the desired device is an optical logic gate or an optical switch. By "pulsed" it is meant that the control signal at any moment of time can have either of two intensities--typically labeled "zero" and "one" or labeled "low" and "high". In prior art, one form of such an optical switch utilizes an optically active element having the property of delivering the controlled beam B as output to a utilization means when the control signal A is "high" (hereinafter "1"; $A=1$), and of not delivering the controlled beam B when the control signal A is "low" (hereinafter "0"; $A=0$) i.e., a positive switch or a logic gate AB or AND, or, in the alternative, of delivering B when A is low ($A=0$), and not delivering B when A is "high" ($A=1$), i.e., a negative or inverting optical switch, a logic $\overline{AB}$.

In a paper authored by K. Tai et al, published in *Applied Physics Letters*, vol. 50, pp. 795-797, entitled "1.55 $\mu$m Optical Logic Etalon With Picojoule Switching Energy Made of InGaAs/InP Multiple Quantum Wells," an optical switch including an indium phosphide based multiple quantum well structure located in a Fabry-Perot etalon (multiple reflection interfermeter) was disclosed in which the control signal was an opical beam A with a wavelength of about 1.06 $\mu$m and the controlled beam B had a wavelength of about 1.55 $\mu$m. The purpose of the etalon is to enhance the contrast ratio of the output when the control beam A is present vs. absent, as known in the art.

It would be desirable, however, to increase the switching speed of such devices, in order that they may be more practical for use in fast operating environments, such as high speed digital optical telecommunications and optical logic.

SUMMARY OF THE INVENTION

The optical switching speed of an optical processing device comprising a semiconductor multiple quantum well mesa structure is increased by its having a side surface into which impurities have been introduced so as to increase the surface recombination velocity of charge carriers.

In a specific embodiment of the invention, an indium phosphide substrate supports a plurality of multiple quantum well mesa structures each comprising alternating layers of indium gallium arsenide and indium phosphide. The side surfaces of each mesa are implanted with an impurity such as arsenic, to increase the surface recombination velocity of charge carriers--whereby, when the mesa structures are used for optical logic or switching, the speed of operation is increased by a factor of as much as about twenty.

BRIEF DESCRIPTION OF THE DRAWINGS

This invention together with its features, advantages, and characteristics can be better understood from the following detailed description when read in conjunction with the drawings in which.

DETAILED DESCRIPTION

Figure 1:
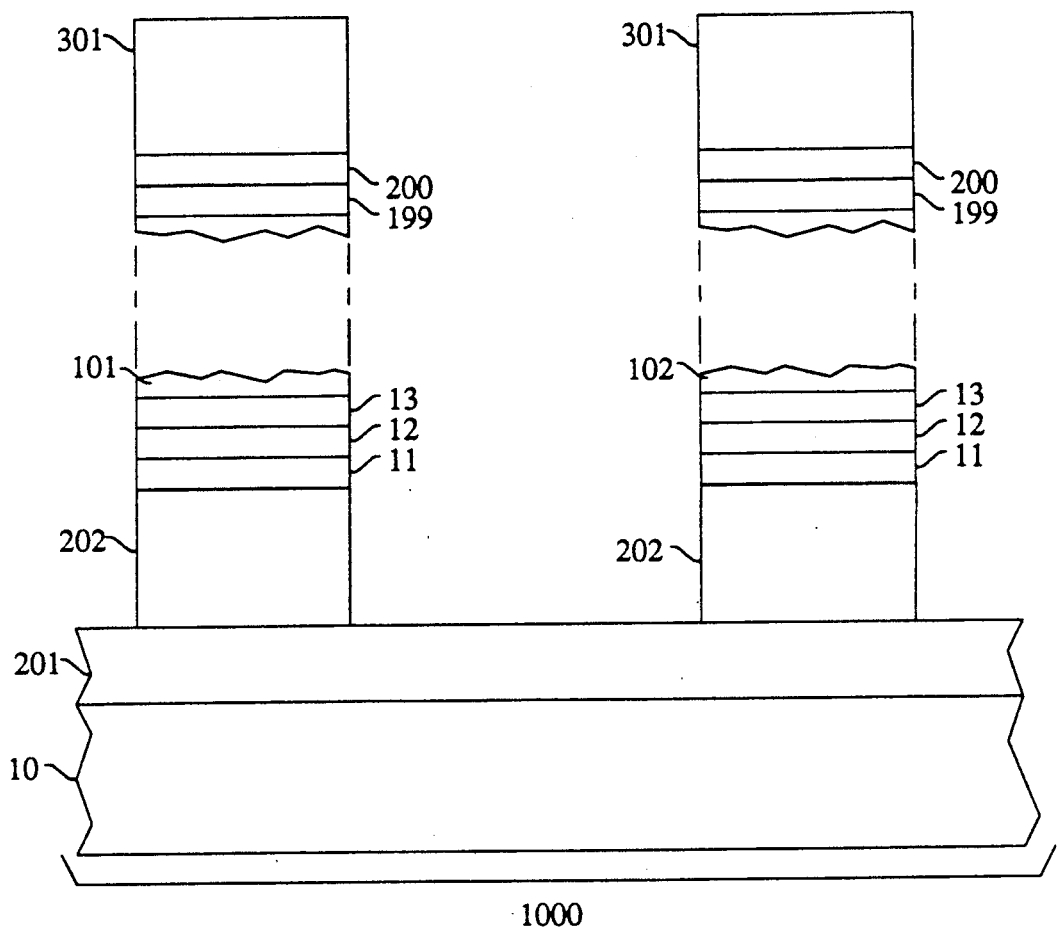
FIG. 1 is an end view of an optical processing device in accordance with a specific embodiment of the invention.

An optical processing device 1000 (FIG. 1) includes a semi-insulating indium phosphide body 10 ("substrate") upon which has been deposited an optical reflector (mirror) 201-202, multiple quantum wells 11, 12, 13 ... 199, and 200, and another mirror 301. Each of the mirrors 201-202 and 203 is itself a multi-layered structure, such as multiple alternating layers (not shown) of indium phosphide and indium gallium arsenide or indium aluminum gallium arsenide, deposited by chemical beam epitaxy, as known in the art. Each of these layers has a thickness of about 0.1 micrometers, so that each of the mirrors is about 92.5% reflecting at a wavelength of 1.55 micrometers, as known in the art.

Between these mirrors is located a plurality of multiple quantum well mesa structures 101, 102 ... composed of alternating layers of indium gallium arsenide 11, 13, ... 199 and indium phosphide 12, ... ,200, for a total of two hundred layers. Each of these quantum well layers is also formed by chemical beam epitaxy, as known in the art. A known anisotropic plasma etching technique is applied to the mirror 301, the multiple quantum wells 11, 12, ... 199, 200, and the mirror 202, whereby mesas 101, 102, ... are formed. Each of these mesas thus contains a multiple quantum well mesa structure formed by layers 11, 12, ... 199, 200.

Advantageously, for lattice matching, the indium to gallium molar ratio in the indium gallium arsenide layers 11, 13, ... 199 is 0.53 to 0.47. Each of these indium gallium arsenide layers 11, ... 199 is undoped and has a thickness of 10 nanometers; each of the indium phosphide layers 12, ... 200 is also undoped but has a thickness of 15 nanometer.

The mirrors 201-202 and 301 supply a Fabry-Perot interferometer (etalon) in which the multiple quantum well mesa structures are located.

After formation of the mesas, the side surfaces of the mesas 101, 102 ...--i.e., the cylindrical columnar surfaces running from the top of the mirror 202 to the bottom of the mirror 301--are subjected to a processing step which introduces surface recombination centers into the multiple quantum well mesa structures 11, 12, 13, ... 199, 200, to increase the recombination velocity of charge carriers. For example, a dose of $10^{12}$ to $10^{13}$ arsenic ions per square centimeter is implanted at about 20KeV into these side surfaces. Alternatively, other ions can be used such as oxygen; or any metal in such as gold, titanium, and the like can be implanted to a dose of about $10^{12}$ to $10^{14}$ per square centimeter, which transforms a neighborhood of the side surface into essentially a zero-bandgap semiconductor material or a metal, to speed up the recombination of charge carriers near the surface.

Typically the diameter of the mesas is about 5 μm for switching speeds of 1 nanosecond. Mesa diameters as small as 1.0 or 0.8 micrometer can be expected to increase the speed further, by a factor of about twenty-five or more.

Figure 2:
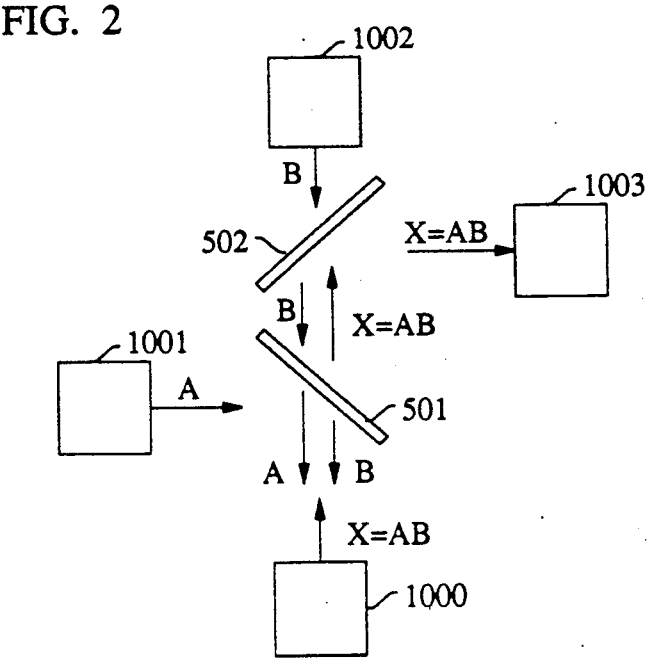
FIG. 2 is a schematic diagram showing an optical logic arrangement using the device shown in FIG. 1.

As shown in FIG. 2, the optical processing device 1000 is used in its reflection mode in an optical switching arrangement wherein essentially monochromatic optical beams A and B are the inputs and essentially monochromatic optical beam X is the output. The wavelengths of A and B are about 0.9 and 1.55 micrometer, respectively. An optical source 1001 supplies the beam A and an optical source 1002 supplies the beam B. The beam A is pulsed; the beam B is continuous wave. A first optical mirror element 501 is designed so as to reflect the beam A but to transmit the beam B. A second optical mirror element 502 is designed as a beam-splitting mirror i.e., is designed to reflect about one-half of the intensity of beam B and to transmit the other half. In this way, both beams A and B are incident normally upon the top surface of the mesas 101, 102, . . . of the device 1000, and thereby propagate down and up in these mesas in an electromagnetic waveguide mode such that the electric field intensity at the side surfaces of the mesas advantageously is zero. It is advantageous that the electromagnetic field vanish at these side surfaces where the recombination centers are located, for otherwise the absorption edge of the semiconductor would be broadened and hence the sensitivity of the device would undersirably be reduced: It is desirable that a small increment in the intensity of beam A should result in a large increment in the intensity of output X.

The output beam X(wavelength=1.55 micrometer) emanates from the device 1000, passes through the mirror element 501, is partially reflected by the beam splitting mirror 502, and is incident upon an optical detection and utilization means for detecting and utilizing the optical radiation of beam X at the 1.55 micrometer wavelength. The parameters of the device 1000 are designed, by trial and error if need be, so that, when B is incident on the device, in the absence of the beam A there is essentially no reflected beam B from the Fabry-Perot interferometer formed in the device 1000. Accordingly, with a predetermined relatively small intensity of the beam A incident upon the device 1000, the nonlinear effects of A upon refractive index and absorption edge will result in a relatively large fraction of B being reflected from the Fabry-Perot to form the beam X. In terms of logic, therefore, X=AB, or X equals A AND B, i.e., in the presence of B,X is appreciable only in the presence of A, as is desired for optical switching of the beam B by the beam A.

For better immunity against noise in the beam A, at some sacrifice of sensitivity to A, a slight offset in the parameters of the device can be incorporated such that the absolute minimum of the intensity of B occurs when A is not quite equal to zero but is equal to a fration (e.g., about 0.3) of the above-mentioned predetermined relatively small intensity.

Although the invention has been described in detail in terms of a specific embodiment, various modification can be made without departing from the scope of the invention. For example, instead of the reflection mode, the transmission mode of the etalon can be used, in which case the detection means 1003 is located on the other side of the device 1000 and the output $X=\overline{A}B$, with B=1. Also, both beams A and B can be pulsed, so that both A and B are logic variables, with X=AB for the case of detection of X after reflection by the etalon and with $X=\overline{A}B$ for the case of detection of X after transmission through the etalon.

Moreover, by doping the mirrors with impurities or by otherwise making them electrically conductive, and attaching electrodes to these mirrors, the beam B can be electronically controlled by an electrical signal A applied to the electrodes, whereby an electronically controlled optical modulator, switch, or logic device can be formed.

We claim:
1. An optical processing arrangement comprising:
    (a) a semiconductor optical processing device including a multiple quantum well mesa semiconductor structure with a side surface into which have been introduced impurities that increase the surface recombination velocity of charge carriers in said semiconductor structure, whereby the optical switching speed of the device is increased;
    (b) an optical interferometer in which the multiple quantum well mesa structure is located;
    (c) first and second optical source means for respectively supplying first and second optical beams incident upon the device; and
    (d) optical detection and utilization means for detecting and utilizing optical radiation emitted by the device in response to the first and second beams.

* * * * *